(12) United States Patent
Tanaka et al.

(10) Patent No.: US 11,476,757 B2
(45) Date of Patent: Oct. 18, 2022

(54) POWER CONVERSION APPARATUS WITH CHOPPER CIRCUITS AND OUTPUT CONTROL

(71) Applicant: Mitsubishi Electric Corporation, Tokyo (JP)

(72) Inventors: Yuya Tanaka, Tokyo (JP); Mai Nakada, Tokyo (JP); Shingo Kato, Tokyo (JP); Matahiko Ikeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 45 days.

(21) Appl. No.: 16/982,767

(22) PCT Filed: Apr. 25, 2018

(86) PCT No.: PCT/JP2018/016733
§ 371 (c)(1),
(2) Date: Sep. 21, 2020

(87) PCT Pub. No.: WO2019/207663
PCT Pub. Date: Oct. 31, 2019

(65) Prior Publication Data
US 2021/0013803 A1   Jan. 14, 2021

(51) Int. Cl.
*H02M 3/158*   (2006.01)
*H02M 3/157*   (2006.01)
(Continued)

(52) U.S. Cl.
CPC .......... *H02M 3/157* (2013.01); *H02M 1/088* (2013.01); *H02M 3/1584* (2013.01); *H02M 1/0009* (2021.05)

(58) Field of Classification Search
CPC ................................................. H02M 3/1584
See application file for complete search history.

(56) References Cited

U.S. PATENT DOCUMENTS

| 4,748,397 A | 5/1988 | Ogawa et al. |
| 2011/0267019 A1* | 11/2011 | Krishnamurthy ... H02M 3/1584 323/283 |

(Continued)

FOREIGN PATENT DOCUMENTS

| JP | 61-142961 A | 6/1986 |
| JP | 2004-304960 A | 10/2004 |

(Continued)

OTHER PUBLICATIONS

International Search Reporting for PCT/JP2018/016733 dated Jun. 12, 2018 [PCT/ISA/210].

(Continued)

*Primary Examiner* — Peter M Novak
(74) *Attorney, Agent, or Firm* — Sughrue Mion, PLLC; Richard C. Turner (57) ABSTRACT

An output voltage of a plurality of chopper circuits is controlled by the average value of ON duties of their respective semiconductor switching elements so that there are provided a shunt controller which detects respective reactor currents of the plurality of chopper circuits and carries out shunt control based on the detected reactor currents and a voltage controller which carries out voltage control based on the detected output voltage, wherein a configuration is such that a control device controls the output voltage so that the reactor currents of the plurality of chopper circuits are equal to each other so as to prevent the average value of the ON duties of the semiconductor switching elements from changing due to the shunt control.

12 Claims, 9 Drawing Sheets

(51) Int. Cl.
*H02M 1/088* (2006.01)
*H02M 1/00* (2006.01)

(56) References Cited

U.S. PATENT DOCUMENTS

2015/0333629 A1  11/2015  Jang et al.
2018/0097454 A1  4/2018   Komatsu

FOREIGN PATENT DOCUMENTS

JP  2014-057521 A  3/2014
JP  2015-220976 A  12/2015
JP  2018-061318 A  4/2018

OTHER PUBLICATIONS

Notice of Reasons for Refusal dated Aug. 17, 2021 by the Japanese Patent Office in Japanese English Application No. 2020-515355 Translation.
Office Action dated Feb. 25, 2022 from the German Patent and Trademark Office in DE Patent Application No. 11 2018 007 516.8.

* cited by examiner

POWER CONVERSION APPARATUS WITH CHOPPER CIRCUITS AND OUTPUT CONTROL

CROSS REFERENCE TO RELATED APPLICATIONS

This application is a National Stage of International Application No. PCT/JP2018/016733 filed Apr. 25, 2018.

TECHNICAL FIELD

The present application relates to the field of a power conversion apparatus which converts a DC voltage to a predetermined voltage, and particularly a power conversion apparatus having therein a plurality of chopper circuits connected in parallel.

BACKGROUND ART

A power conversion apparatus is such that, in order to respond to consumer request for a reduction in the size and weight thereof, it is carried out to connect a plurality of chopper circuits in parallel and put them into operation, and that it is required to keep a current balance between the plurality of chopper circuits in this case.

As a control method which can keep the current balance, in PTL 1, a plurality of chopper circuits, each of which converts an inputted DC voltage to a predetermined DC voltage, are connected in parallel, and it is carried out to take out currents, as chopper currents, from predetermined positions of the circuits, respectively, to detect current deviations between the average value of the individual chopper currents and the chopper currents of the chopper circuits, and to cause these deviation amounts to interrupt a chopper circuit control system as correction amounts, thus controlling an output voltage of the chopper circuits. Owing to this technology shown in PTL 1, by controlling so as to reduce the difference between current values outputted by the plurality of chopper circuits connected in parallel (controlling so that the current values are as equal to each other as possible), the maximum loss of switching elements configuring the chopper circuits is small, and it is possible to provide a smaller-sized, lower-cost power conversion apparatus. Hereinafter, a control method which controls so that the currents of the plurality of chopper circuits are equal to each other will be described as the shunt control (corresponding to control of the currents), and it will be described, as high accuracy of the shunt control, that the maximum value of the differences between the respective assumed output current values of the chopper circuits is smaller than the average value of the output current values of the plurality of chopper circuits.

CITATION LIST

Patent Literature

PTL 1: (JP-A-61-142961)

SUMMARY OF INVENTION

Technical Problem

In the configuration of PTL 1, however, the correction amounts of the shunt control are separately outputted to the plurality of chopper circuits, thereby meaning that the average value of the respective chopper currents of the chopper circuits changes. Particularly, in an operating region with no step up or in an operating region with maximum step up, there is a problem in that the output voltage control and the shunt control interfere with each other, and that the output voltage control is not carried out smoothly by carrying out the shunt control.

The present application has been made to solve the above problem, and an object of the present application is to provide a power conversion apparatus wherein the shunt control never affects the output voltage control.

Solution to Problem

The power conversion apparatus of the present application includes a plurality of chopper circuits connected in parallel; reactor current detectors which detect reactor currents of the chopper circuits, respectively; an output voltage detector which detects an output voltage; and a control device. The control device includes a shunt controller. The shunt controller carries out shunt control based on the detected reactor currents. The control device includes a voltage controller. The voltage controller carries out voltage control based on the detected output voltage, and the voltage controller controls the output voltage of the chopper circuits so that the reactor currents of the plurality of chopper circuits are equal to each other.

Advantageous Effects of Invention

According to the present application, a small-sized power conversion apparatus can be provided by carrying out the shunt control so that the output voltage control and the shunt control do not interfere with each other.

DESCRIPTION OF EMBODIMENTS

First Embodiment

Figure 1:
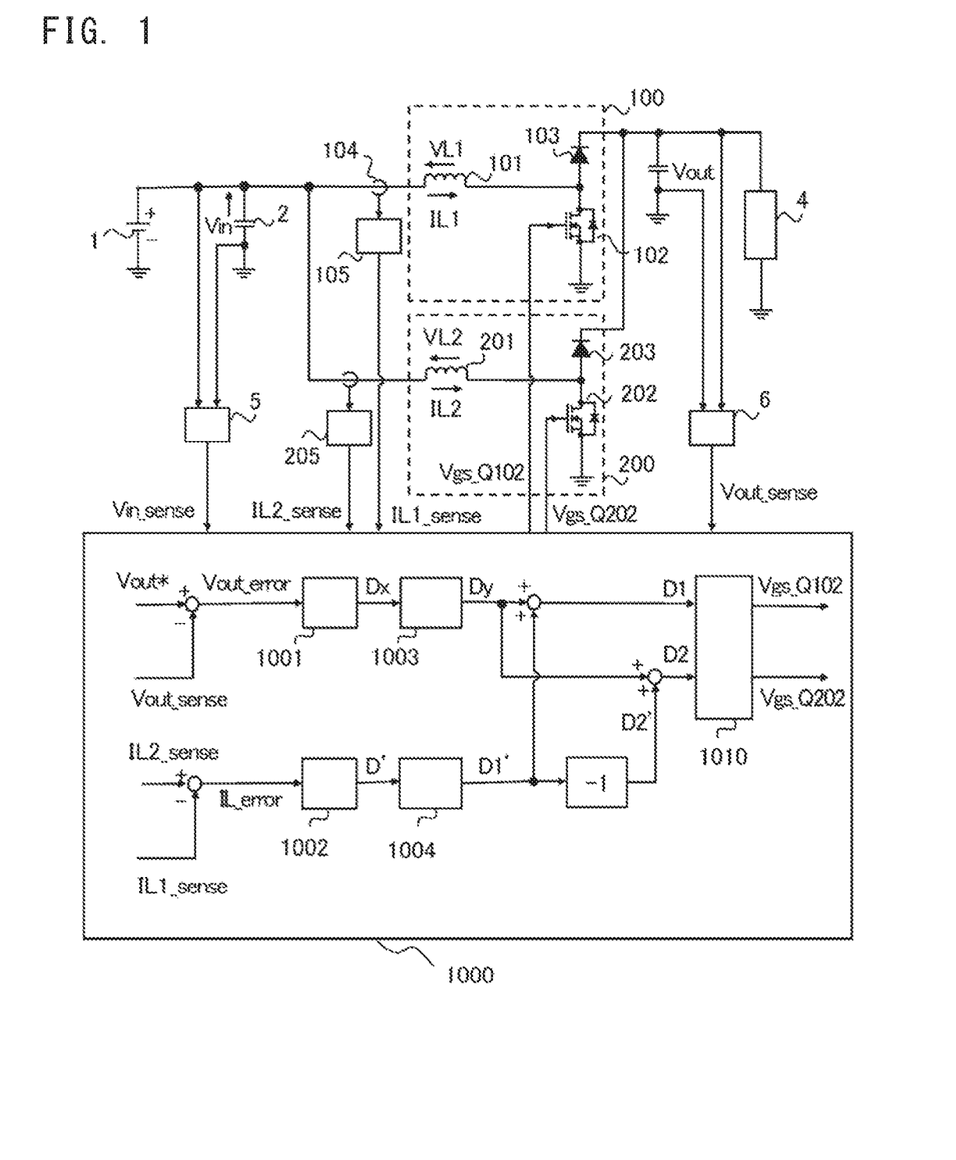
FIG. 1 is a configuration diagram showing a configuration of a power conversion apparatus according to the first embodiment of the present application.
Figure 2:
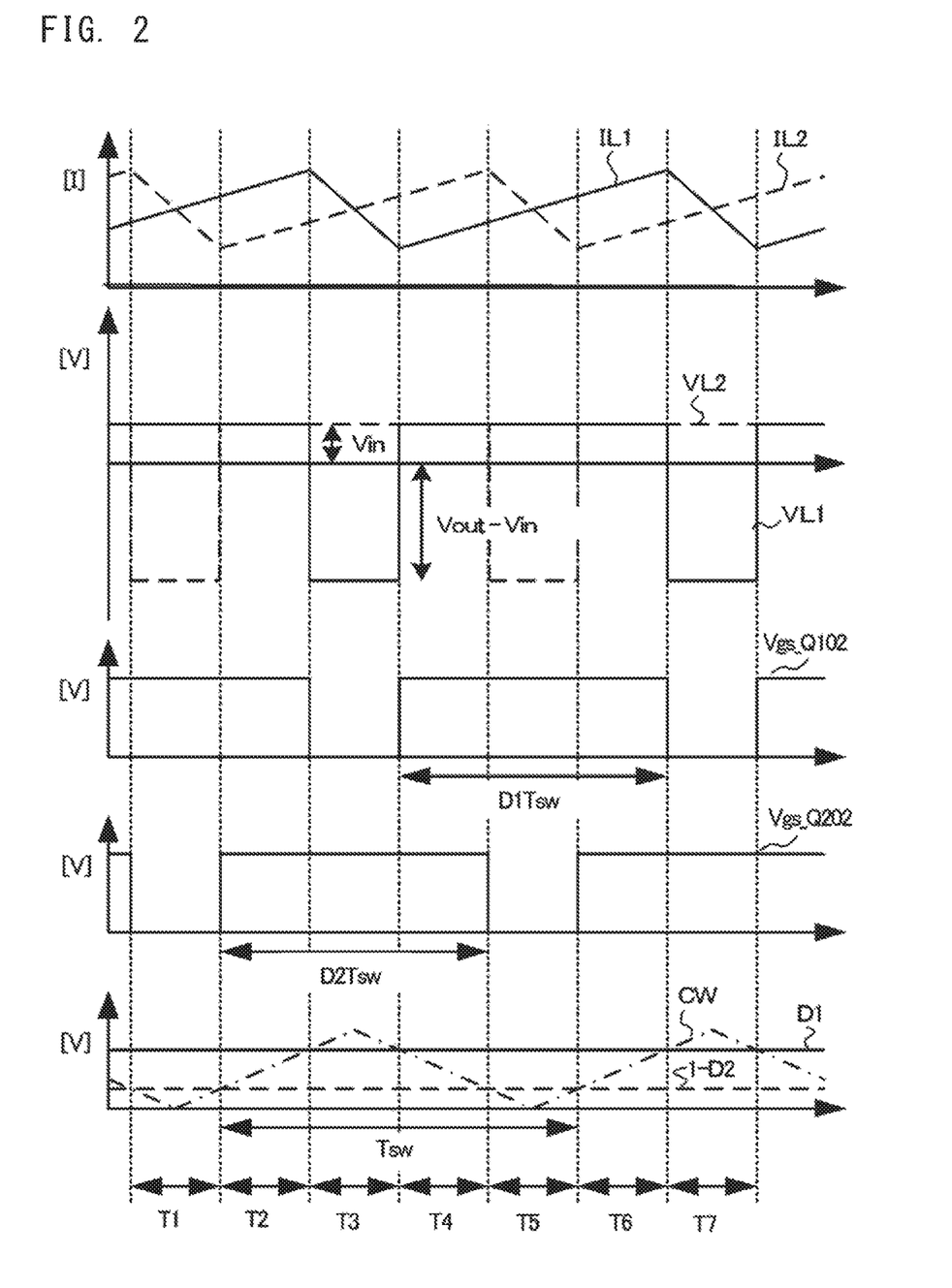
FIG. 2 is operating waveforms in the power conversion apparatus according to the first and second embodiments of the present application.
Figure 4:
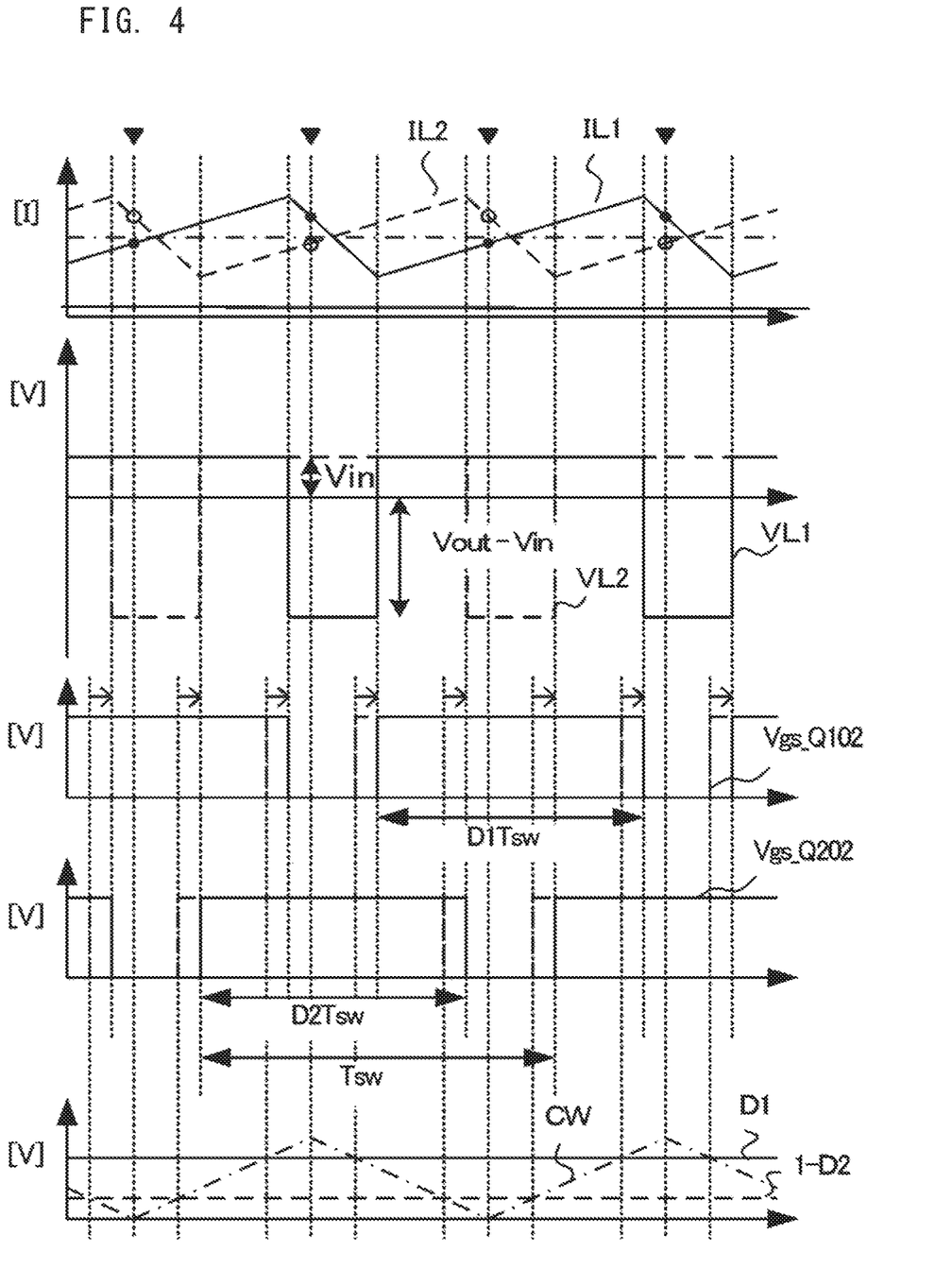
FIG. 4 is a diagram showing operating waveforms in the power conversion apparatus according to the first, third, and fourth embodiments of the present application.

FIG. 1 shows a configuration diagram of a power conversion apparatus of the first embodiment. FIGS. 2 and 4 show operating waveforms in the power conversion apparatus of the first embodiment.

The power conversion apparatus of the first embodiment includes a DC power source 1; an input smoothing capacitor 2 which, being provided between the DC power source 1 and a load 4, is connected in parallel to the DC power source 1; a first chopper circuit 100 which has a reactor 101 connected to the positive side of the input smoothing capacitor 2; a second chopper circuit 200 which is connected in parallel to the first chopper circuit 100; an output smoothing capacitor 3 whose positive side is connected to the cathode terminal of a diode 103 of the first chopper circuit 100 and to the cathode terminal of a diode 203 of the second chopper circuit; an input voltage detector 5 which detects an input voltage Vin of the input smoothing capacitor 2; an output voltage detector 6 which detects an output voltage Vout of the output smoothing capacitor 3; and a control device 1000 which outputs a gate signal Vgs_Q102 of a semiconductor switching element 102 and a gate signal Vgs_Q202 of a semiconductor switching element 202 in the first chopper circuit 100 by using an input voltage value Vin_sense detected by the input voltage detector 5, an output voltage value Vout_sense detected by the output voltage detector 6, a current value IL1_sense detected by a reactor current detector 104 and a reactor current detector low-pass filter 105 in the first chopper circuit 100, and a current value IL2_sense detected by a reactor current detector 204 and a reactor current detector low-pass filter 205 in the second chopper circuit 200 to be described later.

The first chopper circuit 100 includes the reactor 101, the semiconductor switching element 102, the diode 103, the reactor current detector 104 which detects a reactor current IL1, and the reactor current detector low-pass filter 105 which smooths the output of the reactor current detector 104, removes the ripple current of the reactor current IL1, and inputs the reactor current into the control device 1000, wherein the drain terminal of the semiconductor switching element 102 is connected to the terminal side of the reactor 101 different from the terminal thereof to which is connected the input smoothing capacitor 2, and in the same way, the anode terminal of the diode 103 is connected to the terminal side of the reactor 101 different from the terminal thereof to which is connected the input smoothing capacitor 2.

The second chopper circuit 200, being of the same configuration as the first chopper circuit 100, includes a reactor 201, the semiconductor switching element 202, the diode 203, the reactor current detector 204 which detects a reactor current IL2, and the reactor current detector low-pass filter 205 which smooths the output of the reactor current detector 204, removes the ripple current of the reactor current IL2, and inputs the reactor current into the control device 1000.

In the control device 1000, the difference between an output voltage target value Vout* and the output voltage value Vout_sense of the output voltage value Vout is taken, a deviation voltage value Vout_error is outputted, the deviation voltage value Vout_error is inputted into an output voltage controller 1001, and an ON duty Dx calculated by output voltage control is outputted.

The ON duty Dx calculated by the output voltage control is inputted into an output voltage control duty limiter 1003 and corrected to a value within a range determined by the limiter, and an ON duty Dy calculated by the output voltage control is outputted.

The difference between the current value IL2_sense obtained through the reactor current detector low-pass filter 105 of the first chopper circuit 100 and the current value IL1_sense obtained through the reactor current detector low-pass filter 205 of the second chopper circuit 200 is taken, a deviation current value IL_error is outputted, the deviation current value IL_error is inputted into a shunt controller 1002, and an ON duty D' calculated by shunt control is outputted.

The ON duty D' calculated by the shunt control is inputted into a shunt control duty limiter 1004 and corrected to a value within a range determined by the shunt control duty limiter 1004, and an ON-duty correction amount D1' of the semiconductor switching element 102 calculated by the shunt control is outputted.

The ON duty Dy calculated by the output voltage control and the ON duty D' calculated by the shunt control are combined, calculating an ON duty D1 of the semiconductor switching element 102 and an ON duty D2 of the semiconductor switching element 202, but at this time, the ON-duty correction amount D1' of the semiconductor switching element 102 calculated by the shunt control and an ON-duty correction amount D2' of the semiconductor switching element 202 calculated by the shunt control are reversed in polarity and added to the ON duty D calculated by the output voltage control, and thereby the ON-duty correction amounts outputted by the shunt control total to zero.

The ON duty D1 of the semiconductor switching element 102 and the ON duty D2 of the semiconductor switching element 202, which have so far been outputted, are inputted into a gate signal generator 1010 and, as shown in FIG. 2, are compared with a carrier wave CW generated inside the gate signal generator 1010, and the gate signal generator 1010 outputs the gate signals Vgs_Q102 and Vgs_Q202.

The control device 1000 can also be configured by an analog circuit but, in the present embodiment, is assumed to be a device, such as a microcomputer, which can perform a digital calculation. Also, a description has been given of the details of the output voltage and shunt controls, but when not stepped up, it is set not to carry out the output voltage and shunt controls, and the semiconductor switching element 102 and the semiconductor switching element 202 are switched off.

The reactor current detector low-pass filter 105 and the reactor current detector low-pass filter 205 are each such that the cutoff frequency of the reactor current detector low-pass filter is set to $1/10$ or less of a switching frequency 1/Tsw of the chopper circuit, thereby removing the ripple current of the reactor current to $1/10$ or less without depending on the order of the low-pass filter. As shown in FIG. 4, when the cutoff frequency of the reactor current detector low-pass filter is high and two or less times of sampling is carried out per switching cycle, the timing of the sampling deviates from the timing of the DC value of the reactor current, so that a configuration is adopted such that the cutoff frequency of the rector current detector low-pass filter is set to $1/10$ or less of the switching frequency 1/Tsw of the chopper circuit, thereby removing the ripple current, enabling the DC value of the reactor current to be detected.

In the shunt controller 1002, when the cutoff frequency of the reactor current detector low-pass filter is set to $1/10$ or less, it is necessary to reduce the gain of the shunt controller 1002 by the amount equivalent to a decrease in the cutoff frequency, but the phase is advanced by a differentiating element using a PID (Proportional-Integral-Differential) controller as the shunt controller 1002, thus enabling the responsiveness of the shunt control to be maintained at a gain equivalent to that before the cutoff frequency is decreased.

Also, in the shunt controller 1002, the inductance value of the reactors 102 and 202 changes, depending on the currents, under the influence of DC superposition characteristics of the reactors, thereby meaning that the gain of the whole shunt control changes, and also, the gain of the whole shunt control changes because a voltage to be applied to the reactors changes depending on the input and output voltages. In this case, the gain of the shunt controller 1002 is caused to vary in response to a change in the inductance value or to the applied voltage, thereby enabling the responsiveness of the shunt control to be kept constant without depending on the current value of the reactors.

In the shunt control duty limiter 1004, the ON duty D1 of the semiconductor switching element 102 and the ON duty D2 of the semiconductor switching element 202 both reach a value of zero or more, because of which the ON-duty correction amount D1' of the semiconductor switching element 102 calculated by the shunt control and the ON-duty correction amount D2' of the semiconductor switching element 202 calculated by the shunt control do not total to zero unless their respective absolute values are smaller than the difference between the ON duty Dy calculated by the output voltage control and the upper/lower limit of the output voltage control limiter 1003, so that the upper and lower limits are provided so that the respective absolute values of the ON-duty correction amount D1' of the semiconductor switching element 102 calculated by the shunt control and the ON-duty correction amount D2' of the semiconductor switching element 202 calculated by the shunt control are equal to or less than the difference between the ON duty Dy calculated by the output voltage control and the upper limit of the output voltage control limiter 1003 or the difference between the ON duty Dy calculated by the output voltage control and the upper limit of the output voltage control limiter 1003, thus enabling the correction amounts calculated by the shunt control to total to zero without depending on the respective values of the ON duty D' calculated by the shunt control and the ON duty Dy calculated by the output voltage control.

According to the above described power conversion apparatus of the first embodiment, it is possible to control so that the reactor current IL1 and the reactor current IL2 are equal to each other without it happening that the output voltage control and the shunt control interfere with each other in the plurality of chopper circuits connected in parallel.

In particular, a small-sized, low-cost power conversion apparatus can be provided by using as the control device 1000 a device, such as a microcomputer, which can perform a digital calculation.

The reactor current detector low-pass filter 105 and the reactor current detector low-pass filter 205 are such that the cutoff frequency of the reactor current detector low-pass filters is set to 1/10 or less of the switching frequency 1/Tsw of the chopper circuits, thereby meaning that the current value IL1_sense and the current value IL2_sense, which are used for the shunt control, are inputted into the control device 1000 in the state in which the ripple currents of the reactor currents IL1 and IL2 are removed, so that the accuracy of the shunt control can be increased, enabling a smaller-sized, lower-cost power conversion apparatus to be provided.

Now, a detailed description will be given of new problems set by the present application. Here, a specific description will be given by taking up a power conversion apparatus having a chopper circuit configuration wherein two chopper circuits are connected in parallel. The operating waveforms in the power conversion apparatus of the configuration in FIG. 1 are as shown in FIG. 2. Here, the inclination of the reactor current IL1 during an ON period (for example, a period T4, a period T5, and a period T6 in FIG. 2) of the semiconductor switching element 102 is obtained from Equation (1).

[Equation 1]

$$\frac{dI_{L1}}{dt} = \frac{V_{in}}{L_1} \qquad \text{Equation (1)}$$

The inclination of the reactor current IL1 during an OFF period (for example, a period T7 in FIG. 2) of the semiconductor switching element 102 is obtained from Equation (2).

[Equation 2]

$$\frac{dI_{L1}}{dt} = \frac{V_{in} - V_{out}}{L_1} \qquad \text{Equation (2)}$$

The whole inclination of the reactor current IL1 is obtained from Equation (3).

[Equation 3]

$$\frac{dI_{L1}}{dt} = \frac{V_{in}}{L_1}D_1 + \frac{V_{in} - V_{out}}{L_1}(1 - D_1) = \frac{V_{in} - (1 - D_1)V_{out}}{L_1} \qquad \text{Equation (3)}$$

The inclination of the reactor current IL2 during an ON period (for example, a period T2, a period T3, and the period T4 in FIG. 2) of the semiconductor switching element 202 is obtained from Equation (4).

[Equation 4]

$$\frac{dI_{L2}}{dt} = \frac{V_{in}}{L_2} \qquad \text{Equation (4)}$$

The inclination of the reactor current IL2 during an OFF period (for example, the period T5 in FIG. 2) of the semiconductor switching element 202 is obtained from Equation (5).

[Equation 5]

$$\frac{dI_{L2}}{dt} = \frac{V_{in} - V_{out}}{L_2} \qquad \text{Equation (5)}$$

The whole inclination of the reactor current IL2 is obtained from Equation (6).

[Equation 6]

$$\frac{dI_{L2}}{dt} = \frac{V_{in}}{L_2}D_2 + \frac{V_{in} - V_{out}}{L_2}(1 - D_2) = \frac{V_{in} - (1 - D_2)V_{out}}{L_2} \qquad \text{Equation (6)}$$

Here, assuming that input current does not change, Equation (7) is established.

[Equation 7]

$$\frac{dI_{L1}}{dt} + \frac{dI_{L2}}{dt} = 0 \quad \text{Equation (7)}$$

When the sets of simultaneous equations Equation (3), Equation (6), and Equation (7) are solved by setting L_1=L_2, Equation (8) is obtained.

[Equation 8]

$$V_{out} = \frac{1}{1 - \frac{L_2 D_1 + L_1 D_2}{L_1 + L_2}} V_{in} = \frac{1}{1 - \frac{D_1 + D_2}{2}} V_{in} \quad \text{Equation (8)}$$

It can be seen from Equation (8) that the output voltage value Vout changes when the average value of the ON duty of the semiconductor switching element 102 and the ON duty of the semiconductor switching element 202 changes. That is, the shunt control outputs the individual correction amounts, and when the average of the ON duty of the semiconductor switching element 102 and the ON duty of the semiconductor switching element 202 changes, it means that the shunt control affects the output voltage control.

Second Embodiment

Figure 3:
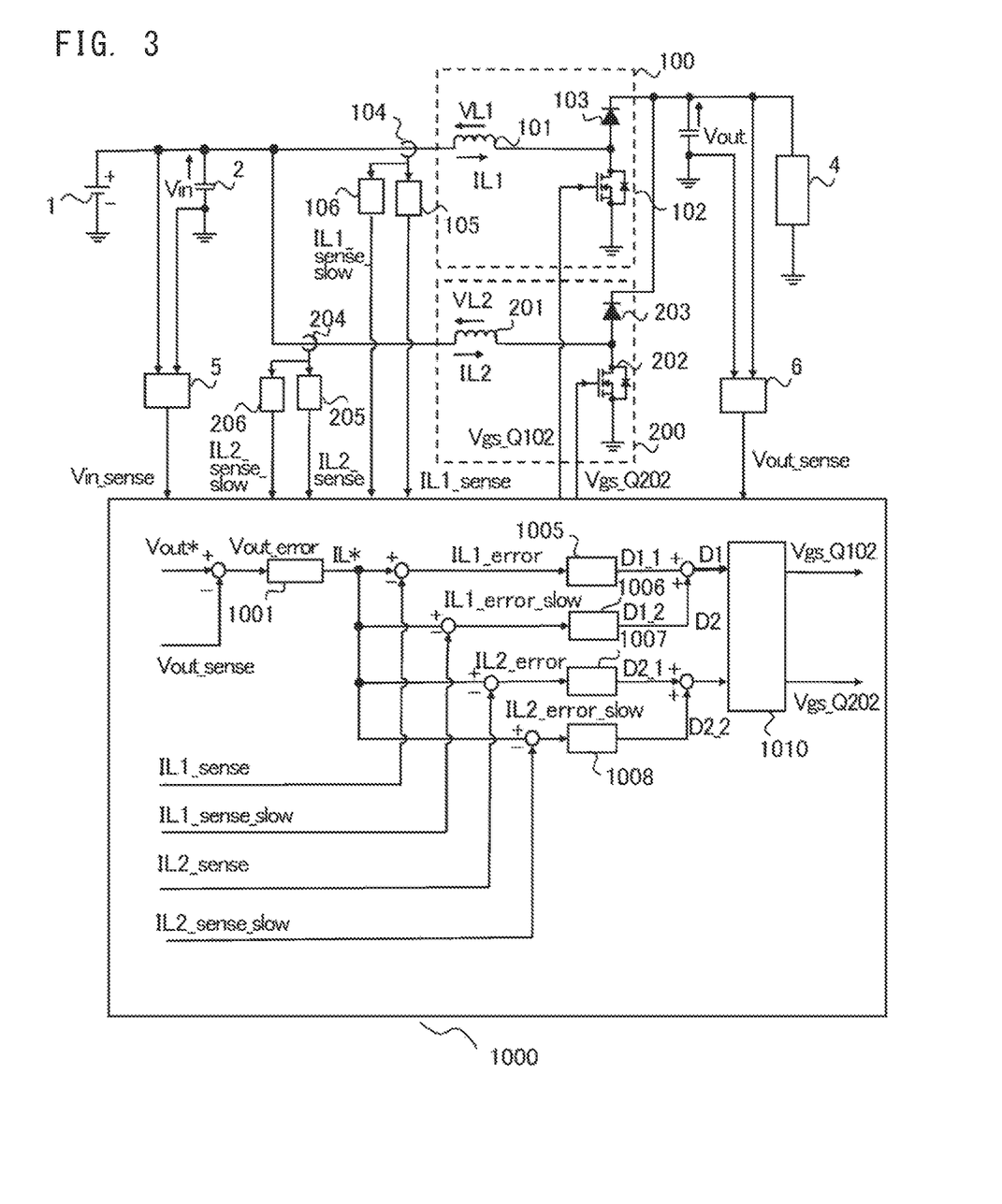
FIG. 3 is a configuration diagram showing a configuration of the power conversion apparatus according to the second embodiment of the present application.

FIG. 3 shows a configuration diagram of a power conversion apparatus to be described in the second embodiment. FIG. 2 shows operating waveforms of the power conversion apparatus to be described in the second embodiment.

The difference of the power conversion apparatus in the second embodiment from the power conversion apparatus in the first embodiment lies in the configuration adopted until the detected values of the reactor currents are taken into the control device 1000 from the reactor current detectors (hereinafter called the configuration around the reactor current detectors) and in the control device 1000.

The configuration around the reactor current detector 104 of the first chopper circuit 100 in the second embodiment is configured of the reactor current detector 104 which detects the reactor current IL1, the reactor current detector low-pass filter 105 which smooths the output of the reactor current detector 104, removes the ripple current of the reactor current IL1, and inputs the reactor current into the control device 1000, and a reactor current detector low-pass filter 106 which is higher in time constant than the reactor current detector low-pass filter 105 which smooths the output of the reactor current detector 104, removes the ripple current of the reactor current IL1, and inputs the reactor current into the control device 1000.

The configuration around the reactor current detector 204 of the second chopper circuit 200 is configured of the reactor current detector 204 which detects the reactor current IL2, the reactor current detector low-pass filter 205 which smooths the output of the reactor current detector 204, removes the ripple current of the reactor current IL2, and inputs the reactor current into the control device 1000, and a reactor current detector low-pass filter 206 which is higher in time constant than the reactor current detector low-pass filter 205 which smooths the output of the reactor current detector 204, removes the ripple current of the reactor current IL2, and inputs the reactor current into the control device 1000.

The control device 1000 in the second embodiment is configured so as to take the difference between the output voltage target value Vout* and the output voltage value Vout_sense of the output voltage value Vout, output the deviation output voltage value Vout_error, input the deviation output voltage value Vout_error into the output voltage controller 1001, and output a reactor current target value IL*.

The difference between the current values IL1_sense and IL* is taken, a deviation current value IL1_error is outputted, the current value IL1_error is inputted into a first shunt controller 1005, and the first shunt controller 1005 outputs a first ON duty D1_1 of the semiconductor switching element 102. The difference between a current value IL1_sense_slow and the current value IL* is taken, a deviation current value IL1_error_slow is outputted, the deviation current value IL1_error is inputted into a second shunt controller 1006, and the second shunt controller 1006 outputs a second ON duty D1_2 of the semiconductor switching element 102. The first ON duty D1_1 of the semiconductor switching element 102 and the second ON duty D1_2 of the semiconductor switching element 102 are added together, making the ON duty D1 of the semiconductor switching element 102.

The difference between the current values IL2_sense and IL* is taken, a deviation current value IL2_error is outputted, the current value IL2_error is inputted into a third shunt controller 1007, and a fourth shunt controller 1008 outputs a first ON duty D2_1 of the semiconductor switching element 202. The difference between a current value IL2_sense_slow and the current value IL* is taken, a deviation current value IL2_error_slow is outputted, the current value IL2_error is inputted into the fourth shunt controller 1008, and the fourth shunt controller 1008 outputs a second ON duty D2_2 of the semiconductor switching element 202. The first ON duty D2_1 of the semiconductor switching element 202 and the second ON duty D2_2 of the semiconductor switching element 202 are added together, making the ON duty D2 of the semiconductor switching element 202.

The difference between the first shunt controller 1005 and the second shunt controller 1006 lies in the order of the controllers, and the first shunt controller 1005 is higher in order than the second shunt controller 1006. This is because the current value IL1_sense inputted into the first shunt controller 1005 and the current value IL1_sense_slow inputted into the second shunt controller 1006 are as follows: the reactor current detector low-pass filter 105 of the former stage is different in time constant, and the current value IL1_sense is the output of the reactor current detector low-pass filter 105 low in time constant, so that the delay of the waveform is short, and the waveform ripple caused by the ripple current of the reactor current IL1 is large, because of which the current value IL1_sense is suited for a high-speed response. Then, the second shunt controller 1006 is irrespective of any order, but includes an integrator element. The current value IL1_sense_slow is the output of the reactor current detector low-pass filter 106 high in time constant, so that the delay of the waveform is long, and the waveform ripple caused by the ripple current of the reactor current IL1 is small, because of which the current value IL1_sense_slow is not suited for a high-speed response, but is suited for enhancing the accuracy of the shunt control, and the integrator element is such as to add values until the deviation reaches zero, so that it is possible to reduce the deviation to zero. The third shunt controller 1007 and the fourth shunt controller 1008 are also different from one another in the same way. That is, they are each, as a control device, of a configuration provided with both an integrator, which uses the output of a low-pass filter of a time constant which can remove the ripple current of a reactor current, and a proportioner which uses the output of a low-pass filter of a time constant which cannot remove the ripple current of the reactor current.

The ON duty D1 of the semiconductor switching element 102 and the ON duty D2 of the semiconductor switching element 102, which have so far been outputted, are inputted into the gate signal generator 1010 and, as shown in FIG. 2, are compared with the carrier wave CW generated inside the gate signal generator 1010, and the gate signal generator 1010 outputs the gate signals Vgs_Q102 and Vgs_Q202.

According to the above described power conversion apparatus of the second embodiment, in the plurality of chopper circuits connected in parallel, it is possible to control so that the reactor current IL1 and the reactor current IL2 are equal to each other.

A smaller-sized, lower-cost power conversion apparatus can be provided by using as the control device 1000 a device, such as a microcomputer, which can perform a digital calculation. Also, by having the reactor current detector low-pass filter 105 and the reactor current detector low-pass filter 106, which are different in time constant, at the subsequent stage of the reactor current detector 104, it is possible to enhance the accuracy without impairing the responsiveness of the shunt control, and possible to provide a smaller-sized, lower-cost power conversion apparatus.

Third Embodiment

A power conversion apparatus of the third embodiment, being of the same configuration as that of the first embodiment, is of the configuration shown in FIG. 1. In the third embodiment, the configuration is such that a device, such as a microcomputer, which can perform a digital calculation is used as the control device 100, and that the input voltage value Vin_sense, the output voltage value Vout_sense, the current value IL1_sense, and the current value IL2_sense are inputted into the control device 1000 in the form of discrete waveforms but not in the form of continuous waveforms. In the power conversion apparatus described in the third embodiment, four or more times of sampling is carried out per switching cycle.

Figure 5:
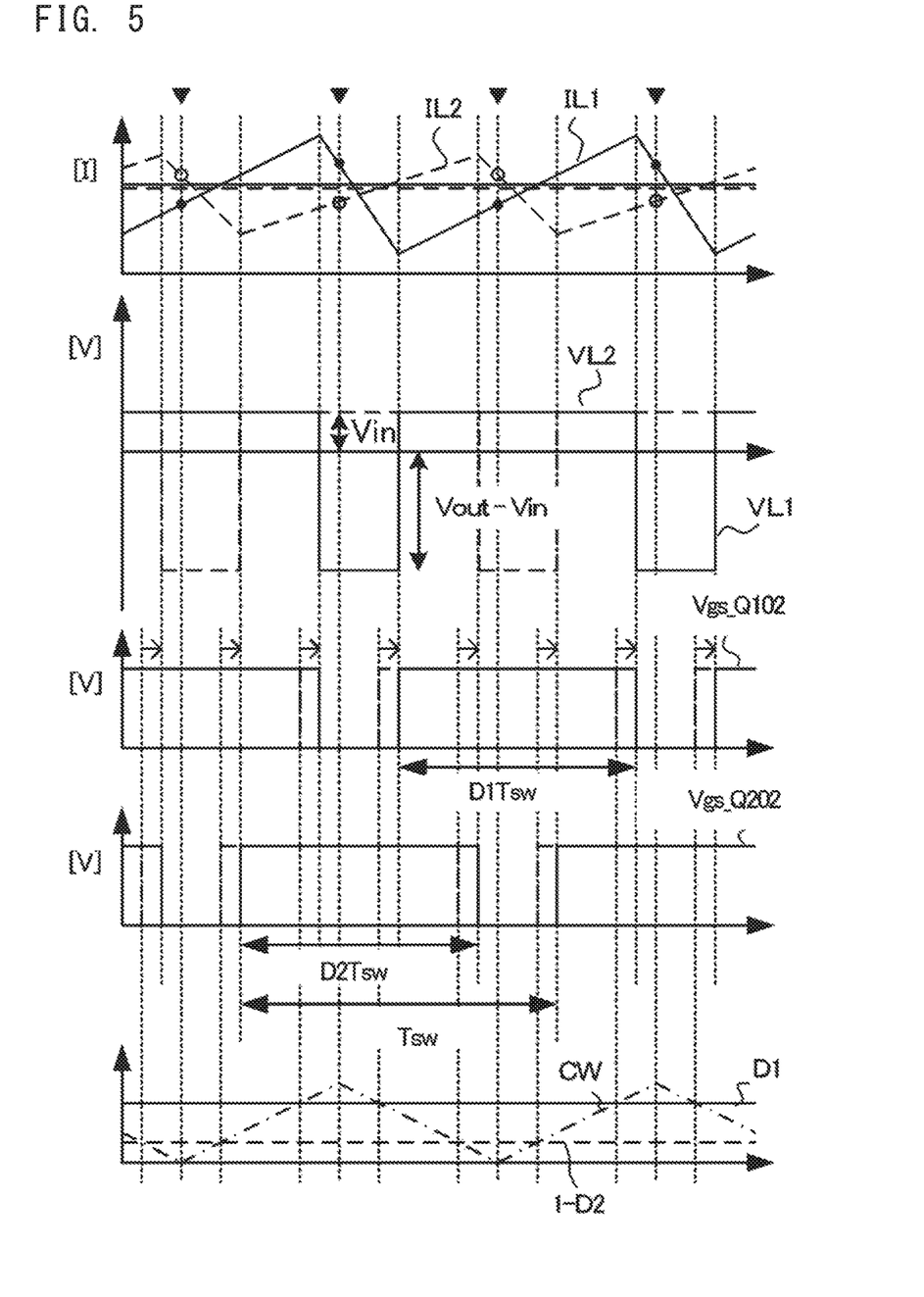
FIG. 5 is a diagram showing operating waveforms in the power conversion apparatus according to the third and fourth embodiments of the present application.

FIGS. 4 and 5 show waveforms formed when two times of sampling is taken in per switching cycle in the form of discrete waveforms in order to describe the reason for increasing the number of times of sampling. In FIG. 4, a delay element is added to two times of sampling per switching cycle and to the gate signals Vgs_Q102 and Vgs_Q202. The delay element for the gate signals Vgs_Q102 and Vgs_Q202, although not shown in FIG. 1, is produced by a propagation delay of a gate signal generator circuit provided between the control device 1000 and the semiconductor switching elements. The delay of the gate signals (shown by the arrows in the drawings) also causes other waveforms of the reactor currents or the like to be delayed. The delay of each waveform caused by the delay of the gate signals will hereinafter be called the delay of waveforms. Sampling timings (the timings shown by the black triangles in the drawings) are carried out at the crests and troughs of the carrier wave CW.

When the reactor 101 and the reactor 102 are equal in inductance value to each other, as shown in FIG. 4, the delay of the gate signals causes the sampling values of the reactor currents to differ from the DC values of the reactor currents, but the average value of the sampling values IL1_sense (shown by the filled circles in the drawing) of the reactor current is equal to the average value of the sampling values IL2_sense (shown by the open circles in the drawing) of the reactor current IL2, so that it does not happen that the accuracy of the shunt control decreases.

On the other hand, when the reactor 101 and the reactor 201 are different in inductance value from one another, as shown in FIG. 5, a difference occurs between the average value of the sampling values IL1_sense of the reactor current and the average value of the sampling values IL2_sense of the reactor current IL2, thus meaning that the accuracy of the shunt control decreases. This is because the principle that the average value of the sampling values of the reactor current deviates from the DC value of the reactor current leads to carrying out sampling before the DC value in the waveform due to the delay of the waveform.

The reactor current rises at gate on and falls at gate off, so that in the case of the same gate delay time, the average value of the reactor current sampling values is smaller than the DC value of the reactor current when the absolute value of the inclination at gate on is larger than the absolute value of the inclination at gate off, while the average value of the reactor current sampling values is larger than the DC value of the reactor current when the absolute value of the inclination at gate on is smaller than the absolute value of the inclination at gate off.

As in the first and second embodiments, in the event that the time constant of the reactor current detector low-pass filter is made constant or higher, no more deviation between the average value of the sampling values of and the DC value of the reactor current is caused by the delay, but when the time constant of the reactor current detector low-pass filter cannot be made constant or higher, the number of times of sampling is increased, particularly, is increased to four or more, and thereby it is possible to suppress the deviation between the average value of the reactor current sampling values and the DC value of the reactor current.

According to the above described power conversion apparatus of the first embodiment, it is possible to enhance the accuracy of the shunt control in the plurality of chopper circuits connected in parallel, and possible to provide a smaller-sized, lower-cost power conversion apparatus.

Fourth Embodiment

FIG. 1 shows a configuration diagram of a power conversion apparatus to be described in the fourth embodiment. FIG. 5 shows waveforms with which to describe the principle of the power conversion apparatus to be described in the fourth embodiment.

The power conversion apparatus described in the fourth embodiment is the same in configuration as in the first embodiment. The reactor 101 and the reactor 201 are configured to have DC superposition characteristics, wherein the larger the absolute value of flowing current, the smaller the inductance value. When a device, such as a microcomputer, which can perform a digital calculation is used as the control device 1000, it means that the input voltage value Vin_sense, the output voltage value Vout_sense, the current value IL1_sense, and the current value IL2_sense are inputted into the control device 1000 in the form of discrete waveforms but not in the form of continuous waveforms. In the fourth embodiment, the number of times of sampling is made two or less per switching cycle. As described in the third embodiment, when the number of times of sampling is two or less and the reactor 101 and the reactor 201 are different in inductance value from one another, there occurs the phenomenon that the DC value of the reactor current and the average value of the detection values of the reactor current deviate from each other.

The power conversion apparatus described in the fourth embodiment is such that the deviation between the DC value of the reactor current and the average value of the detection values of the reactor current, which is caused by the deviation between the reactor current detection values which is produced by the reactor current detectors and the reactor current detector low-pass filters when taking the reactor currents into the control device 1000, is reduced by utilizing the phenomenon that the DC value of the reactor current and the average value of the detection values of the reactor current deviate from each other when the number of times of sampling is two or less and the reactor 101 and the reactor 201 are different in inductance value from one another.

First, with respect to the current value IL1_sense and the current value IL2_sense which are the reactor current detection values, it is assumed that an error is produced by the reactor current detectors and the reactor current detector low-pass filters, and that it is detected that the current value IL1_sense is smaller than the current value IL2_sense when the reactor current IL1 and the current value IL2 are equal to each other. Then, the shunt control controls in such a way that the current value IL1_sense and the current value IL2_sense are equal to each other, so that the DC value of the current value IL1 is larger than the DC value of the current value IL2_sense. The difference between the DC value of the current value IL1 and the DC value of the current value IL2 creates a difference in inductance due to DC superposition characteristics of the reactors 101 and 201. The larger the DC value of the reactor current, the smaller the inductance value, so that the inductance value of the reactor 101 is smaller than the inductance value of the reactor 201.

Figure 6:
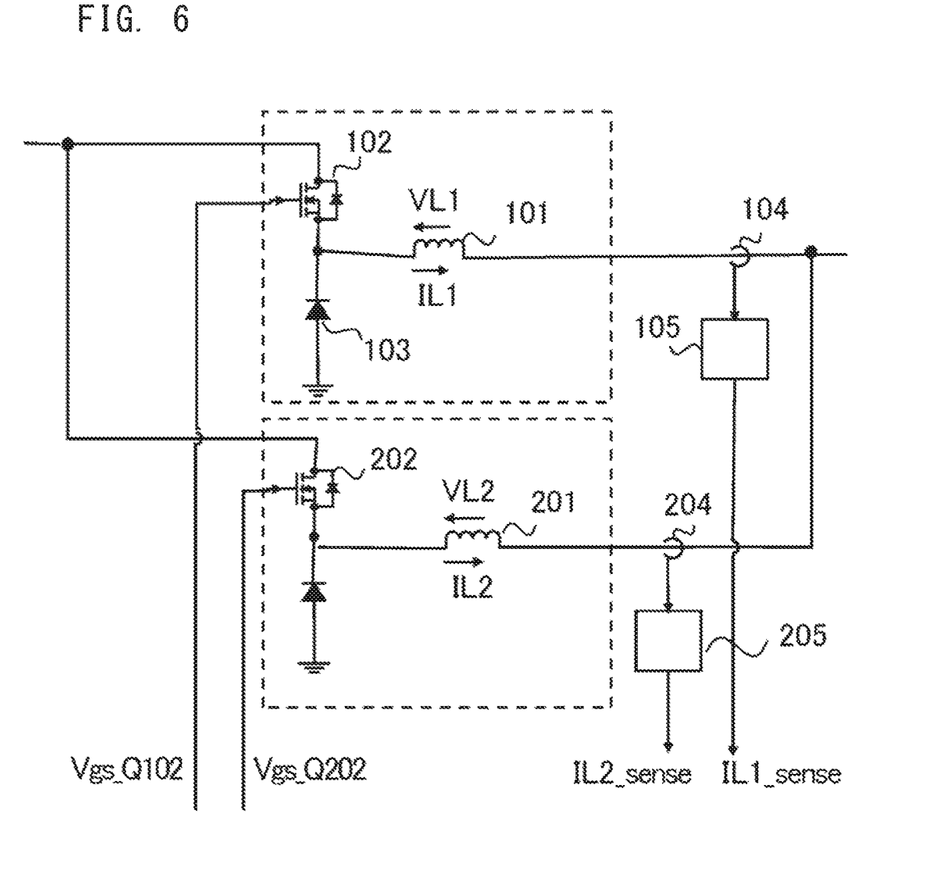
FIG. 6 is a configuration diagram showing another configuration of the power conversion apparatus according to the first to fourth embodiments of the present application.
Figure 7:
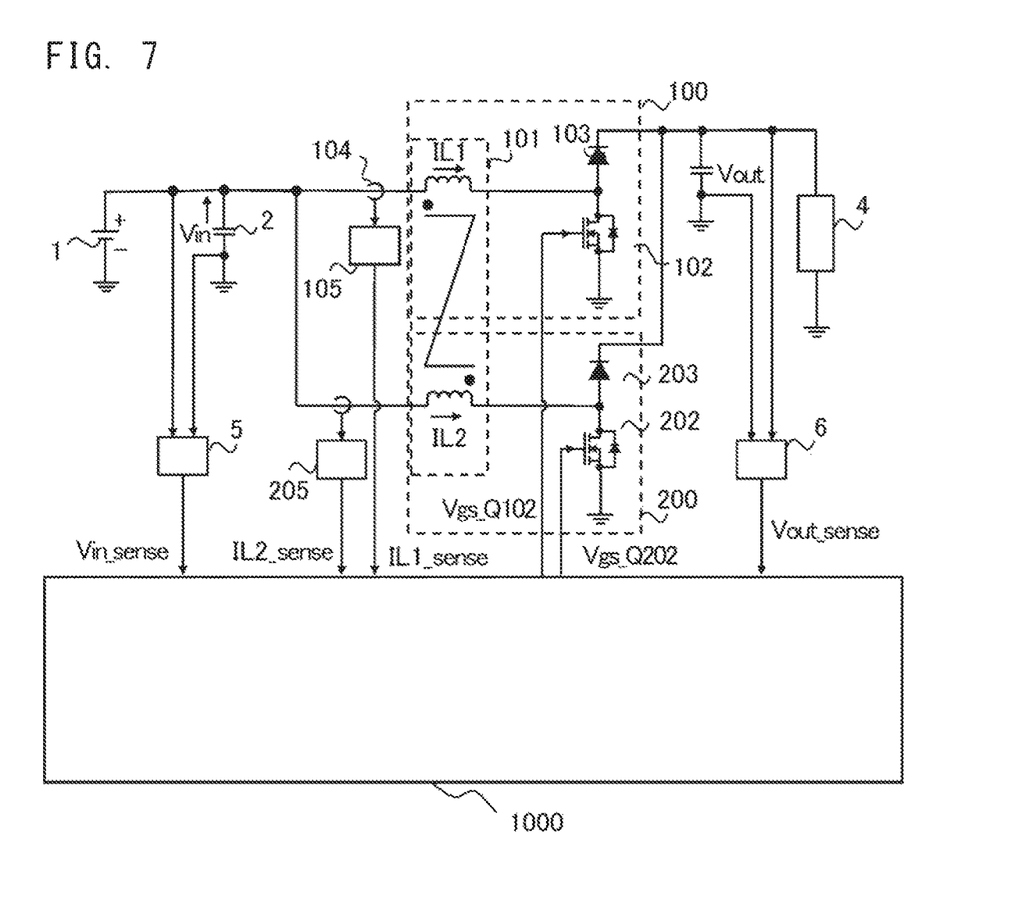
FIG. 7 is a configuration diagram showing another configuration of the power conversion apparatus according to the first to fourth embodiments of the present application.

Also, the first to fourth embodiments can be applied to any power conversion apparatus as long as it is a power conversion apparatus which has, other than the step-up chopper circuits shown in FIGS. 1 and 2, a plurality of chopper circuits of a step-down chopper type such as in FIG. 6, a coupling reactor type such as in FIG. 7, or the like, which, having semiconductor switching elements, diodes, and reactors, control an input-output voltage ratio with the ON duties of the semiconductor switching elements.

Figure 8:
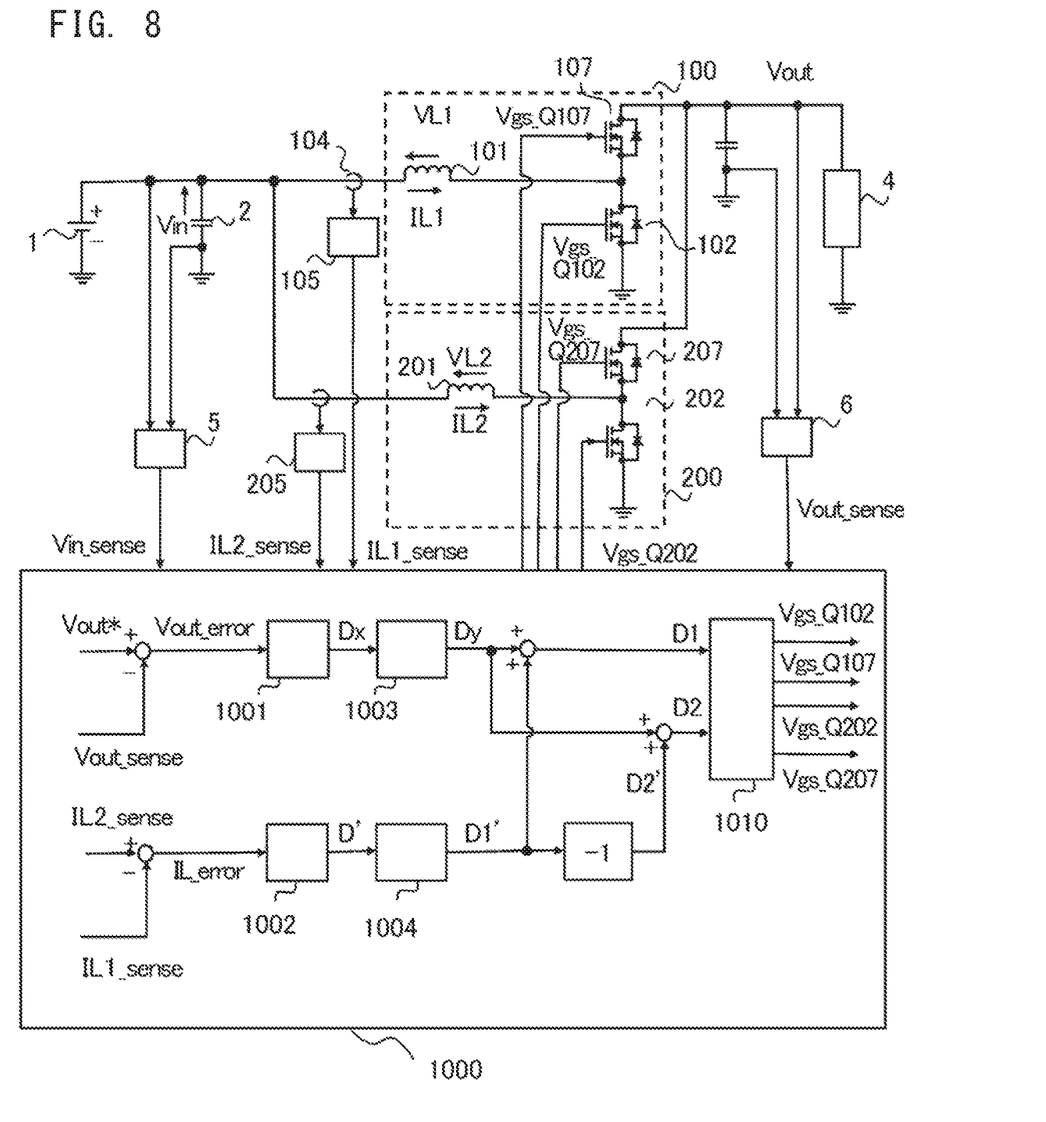
FIG. 8 is a configuration diagram showing another configuration of the power conversion apparatus according to the first to fourth embodiments of the present application.

Also, as shown in FIG. 8, the embodiments can be applied to any power conversion apparatus as long as it is a power conversion apparatus which has a plurality of bidirectional chopper circuits which, having series-connected semiconductor switching elements and reactors, control an input-output voltage ratio with the ON duties of the semiconductor switching elements. The bidirectional chopper circuit of FIG. 8 is of a step-up chopper type, but the embodiments can also be applied to a power conversion apparatus which has a plurality of bidirectional chopper circuits of a type other than a step-down chopper type such as in FIG. 6, a coupling reactor type such as in FIG. 7, and the like.

Figure 9:
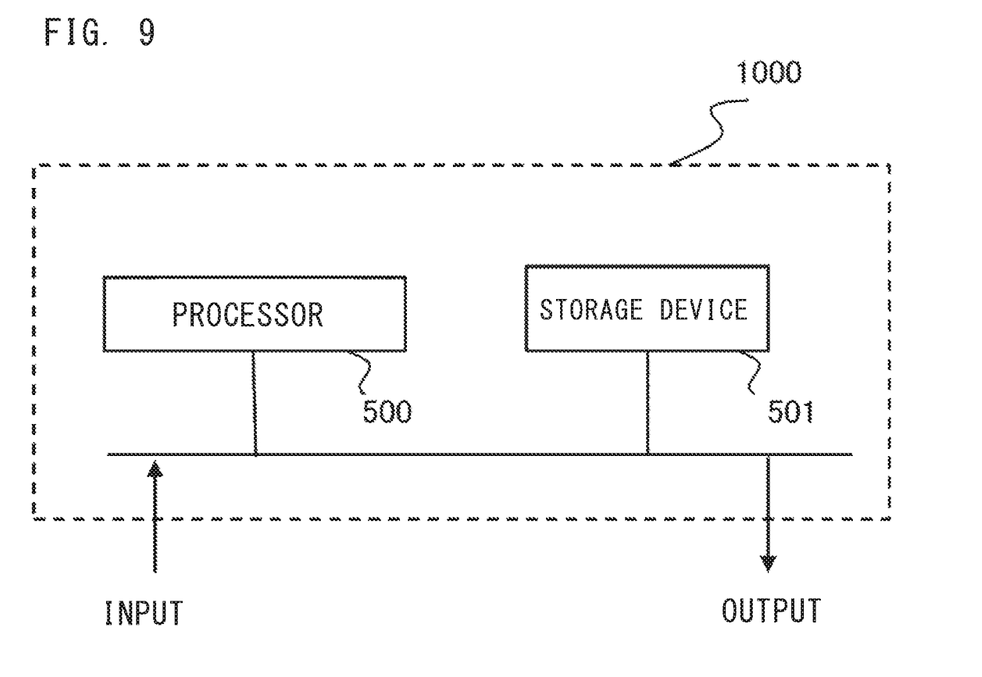
FIG. 9 is a configuration diagram showing a configuration example of hardware which is a control device of the present application.

The control device 1000 is configured of a processor 500 and a storage device 501, as one example of hardware is shown in FIG. 9. The storage device 501, although the details thereof are not shown, includes a volatile storage device, such as a random access memory, and a nonvolatile auxiliary storage device, such as a flash memory. Also, it may include an auxiliary storage device, such as a hard disk, in place of a flash memory. The processor 500 executes a program inputted from the storage device 501. In this case, the program is inputted into the processor 500 from the auxiliary storage device via the volatile storage device. Also, the processor 500 may output data, such as a calculation result, to the volatile storage device of the storage device 501, and may also store the data into the auxiliary storage device via the volatile storage device.

Although the present application is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1 DC power source, 2 input smoothing capacitor, 3 output smoothing capacitor, 4 load, 5 input voltage detector, 6 output voltage detector, 100 first chopper circuit, 200 second chopper circuit, 101 201 reactor, 102 202 semiconductor switching element, 103 203 diode, 104 204 reactor current detector, 105 106 205 206 reactor current detector low-pass filter, 500 processor, 501 storage device, 1000 control device, 1001 output voltage controller, 1002 shunt controller, 1003 output voltage control duty limiter, 1004 shunt control duty limiter, 1005 first shunt controller, 1006 second shunt controller, 1007 third shunt controller, 1008 fourth shunt controller

The invention claimed is:

1. A power conversion apparatus, comprising:
a plurality of chopper circuits connected in parallel, wherein the plurality of chopper circuits includes a first chopper circuit and a second chopper circuit, the first chopper circuit including a first inductor through which a first current flows and the second chopper circuit including a second inductor through which a second current flows;
a plurality of reactor current detectors which detect reactor currents of the plurality of chopper circuits, respectively, wherein the plurality of reactor current detectors include a first reactor current detector configured to detect the first current in the first inductor and a second reactor current detector configured to detect the second current in the second inductor;
a first low-pass filter coupled to the first reactor current detector and configured to provide a first sense signal related to the first current;
a second low-pass filter coupled to the first reactor current detector and configured to provide a first slow sense signal related to the first current;
a third low-pass filter coupled to the second reactor current detector and configured to provide a second sense signal related to the second current;
a fourth low-pass filter coupled to the second reactor current detector and configured to provide a second slow sense signal related to the second current;
an output voltage detector which detects an output voltage; and a control device which, having a shunt controller configured to carry out shunt control based on at least the first sense signal, the first slow sense signal, the second sense signal and the second slow sense signal, and an output voltage controller configured to carry out voltage control based on the detected output voltage, and control the output voltage of the plurality of chopper circuits so that the reactor currents of the plurality of chopper circuits are equal to each other, wherein the first sense signal and the second sense signal are configured to respond to rapid changes in the first current and the second current, respectively, and wherein the first slow sense signal and the second slow sense signal are configured to avoid a reduction in performance of the shunt controller when a first value of the first inductor is different than a second value of the second inductor.

2. The power conversion apparatus according to claim 1, wherein duty cycle values of gate signals of the plurality of chopper circuits are a sum of a value with which to cause the detected output voltage to follow a target value and values with which to control so that the respective detected reactor currents of the plurality of chopper circuits are equal to each other, and the sum is configured to control so that the reactor currents of the plurality of chopper circuits are equal to each other and the sum is configured to tend toward zero.

3. The power conversion apparatus according to claim 2, wherein an absolute value of the value of a shunt control duty limiter is equal to or smaller than a first difference between an ON duty calculated by the output voltage controller and an upper limit of an output voltage control duty limiter, or a second difference between the ON duty calculated by the output voltage controller and a lower limit of the output voltage control duty limiter.

4. The power conversion apparatus according to claim 1, wherein duty cycle values of gate signals of the plurality of chopper circuits are outputted as target values of the reactor currents in order to cause the detected output voltage to follow a target value, and the reactor currents of the plurality of chopper circuits are calculated based on a deviation between the target values of the reactor currents.

5. The power conversion apparatus according to claim 1, wherein a portion or all of reactors of one of the plurality of chopper circuits are magnetically coupled to corresponding reactors of another chopper circuit.

6. The power conversion apparatus according to claim 1, wherein the control device is a device which can perform a digital calculation.

7. The power conversion apparatus according to claim 1, wherein each reactor current detector of the plurality of reactor current detectors carries out four or more times of sampling per switching cycle.

8. The power conversion apparatus according to claim 1, wherein the first low-pass filter is configured with a cutoff frequency of $\frac{1}{10}$ or less of a switching frequency.

9. The power conversion apparatus according to claim 8, wherein the shunt controller is a PID controller.

10. The power conversion apparatus according to claim 1, wherein an inductance value of the first inductor changes within an operating range, the inductance value causing a first timing of a sampling to deviate from a second timing at which a DC value of the first current occurs.

11. The power conversion apparatus according to claim 1, wherein the control device comprises:
  an integrator configured to operate on the first slow sense signal; and
  a proportioner configured to operate on the first sense signal.

12. The power conversion apparatus according to claim 1, wherein the shunt controller changes a gain using an operating condition.

* * * * *